US012691929B2

(12) United States Patent
Suzuki et al.

(10) Patent No.: US 12,691,929 B2
(45) Date of Patent: Jul. 28, 2026

(54) MOBILE OBJECT CONTROL SYSTEM

(71) Applicant: TOYOTA JIDOSHA KABUSHIKI KAISHA, Toyota (JP)

(72) Inventors: Yoshiaki Suzuki, Aichi-gun (JP); Shintaro Saigo, Nisshin (JP); Ryo Irie, Okazaki (JP); Yuji Watari, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 18/935,849

(22) Filed: Nov. 4, 2024

(65) Prior Publication Data

US 2025/0242857 A1     Jul. 31, 2025

(30) Foreign Application Priority Data

Jan. 31, 2024     (JP) ................................ 2024-012660

(51) Int. Cl.
B62D 5/04          (2006.01)
B62D 6/00          (2006.01)

(52) U.S. Cl.
CPC ............. B62D 5/046 (2013.01); B62D 6/002 (2013.01)

(58) Field of Classification Search
CPC ...... B62D 5/046; B62D 6/002; B62D 15/025; B62D 5/0463
See application file for complete search history.

(56) References Cited

U.S. PATENT DOCUMENTS 7,692,534 B2    4/2010    Kataoka et al.
8,352,124 B2    1/2013    Taguchi 8,682,500 B2    3/2014    Sakugawa
8,818,634 B2    8/2014    Fujita et al.
9,168,953 B2    10/2015   Mitsumoto et al.
9,714,034 B2    7/2017    Otake et al.
9,880,558 B2    1/2018    Nakamura
9,902,399 B2    2/2018    Torii et al.
10,345,443 B2   7/2019    Masui et al.

(Continued)

FOREIGN PATENT DOCUMENTS

JP          2020-069990 A        5/2020

*Primary Examiner* — Grant Moubry
*Assistant Examiner* — Ruben Picon-Feliciano
(74) *Attorney, Agent, or Firm* — SoraIP, Inc.

(57)          ABSTRACT

A mobile object control system includes: a higher-level ECU that calculates a requested physical quantity according to each of switchable first and second higher-level applications; a lower-level ECU that receives the requested physical quantity and calculates an actuator command value for causing the detected physical quantity to follow the requested physical quantity according to the first or second lower-level application while switching the first and second lower-level applications along with switching the higher-level applications; and an actuator. The first and second lower-level applications implement controls different in followability of the detected physical quantity to the requested physical quantity. The lower-level ECU performs a change amount suppression process for a gentler change from a previous value to a current value of the requested physical quantity; and substitutes the detected physical quantity into the previous value in the change amount suppression process in response to switching the first and second higher-level applications.

5 Claims, 7 Drawing Sheets

(56) References Cited

U.S. PATENT DOCUMENTS

| | | | |
|---|---|---|---|
| 10,611,240 B2 | 4/2020 | Masui et al. | |
| 2008/0015755 A1* | 1/2008 | Kuwahara | B60W 30/188 |
| | | | 701/54 |
| 2018/0099690 A1* | 4/2018 | Oya | B62D 5/0463 |
| 2021/0245796 A1 | 8/2021 | Aoki et al. | |

* cited by examiner

FIG. 6

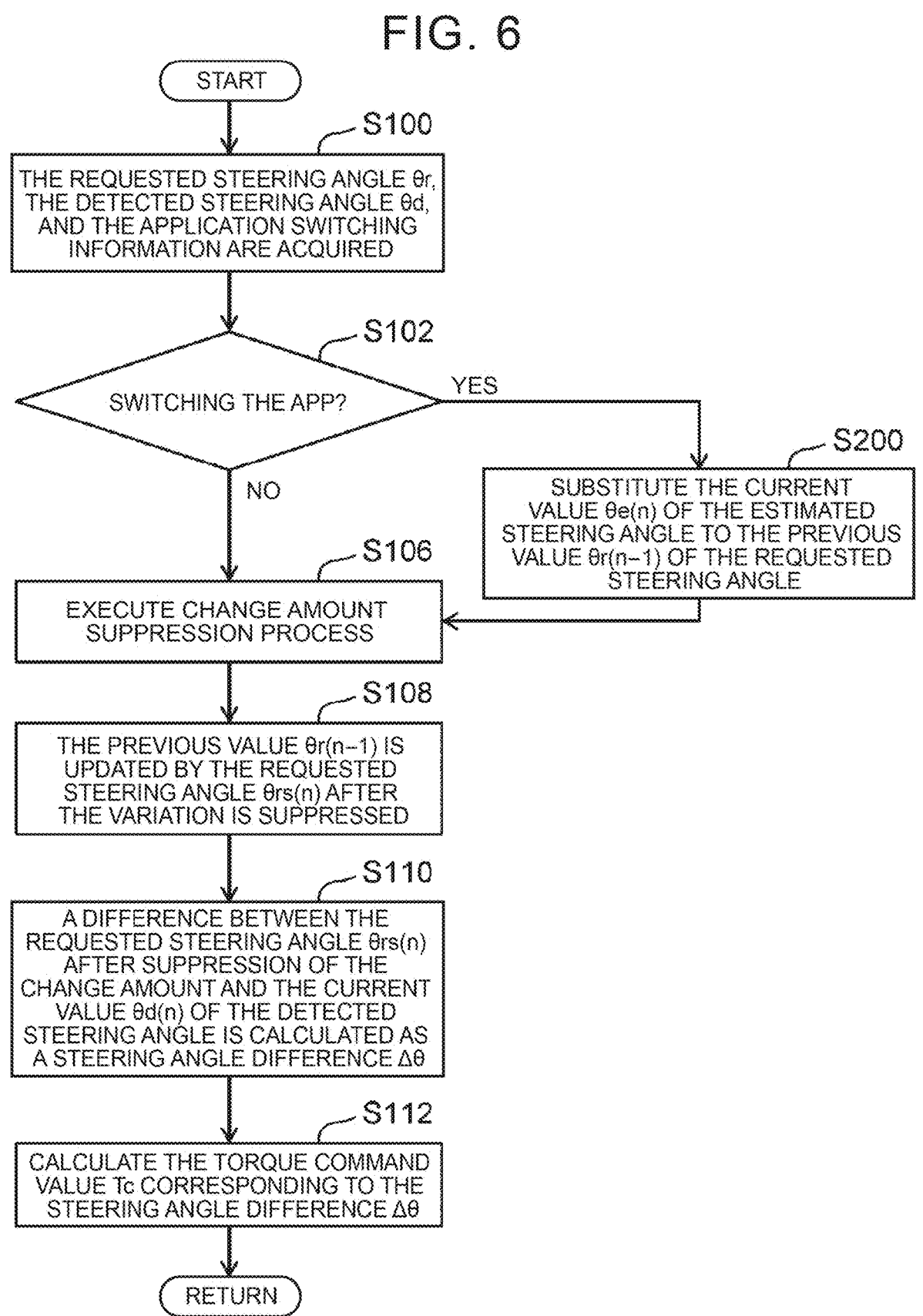

START

S100

THE REQUESTED STEERING ANGLE θr, THE DETECTED STEERING ANGLE θd, AND THE APPLICATION SWITCHING INFORMATION ARE ACQUIRED

S102

SWITCHING THE APP?

YES

NO

S200

SUBSTITUTE THE CURRENT VALUE θe(n) OF THE ESTIMATED STEERING ANGLE TO THE PREVIOUS VALUE θr(n−1) OF THE REQUESTED STEERING ANGLE

S106

EXECUTE CHANGE AMOUNT SUPPRESSION PROCESS

S108

THE PREVIOUS VALUE θr(n−1) IS UPDATED BY THE REQUESTED STEERING ANGLE θrs(n) AFTER THE VARIATION IS SUPPRESSED

S110

A DIFFERENCE BETWEEN THE REQUESTED STEERING ANGLE θrs(n) AFTER SUPPRESSION OF THE CHANGE AMOUNT AND THE CURRENT VALUE θd(n) OF THE DETECTED STEERING ANGLE IS CALCULATED AS A STEERING ANGLE DIFFERENCE Δθ

S112

CALCULATE THE TORQUE COMMAND VALUE Tc CORRESPONDING TO THE STEERING ANGLE DIFFERENCE Δθ

RETURN

MOBILE OBJECT CONTROL SYSTEM

CROSS-REFERENCE TO RELATED APPLICATION

This application claims priority to Japanese Patent Application No. 2024-012660 filed on Jan. 31, 2024, incorporated herein by reference in its entirety.

BACKGROUND

1. Technical Field

The present disclosure relates to a mobile object control system.

2. Description of Related Art

Japanese Unexamined Patent Application Publication No. 2020-069990 (JP 2020-069990 A) discloses a steering control device for a vehicle. The steering control device is configured to switch between assist control for generating an assist torque corresponding to a steering torque of a driver and follow-up control for causing a detected value of a physical quantity related to steering to follow a target value of the physical quantity.

SUMMARY

The mobile object control system includes a higher-level electronic control unit (ECU) that calculates a requested physical quantity of a mobile object (for example, a requested steering angle of a vehicle) according to a plurality of switchable higher-level applications. The mobile object control system further includes a lower-level electronic control unit (ECU) that receives the requested physical quantity from the higher-level electronic control unit and calculates an actuator command value while switching a plurality of lower-level applications in conjunction with switching of the higher-level applications. The actuator command value is a command value for causing a detected physical quantity (for example, a detected steering angle) to follow the requested physical quantity. Such a mobile object control system has room for improvement in the following respect. That is, when a timing deviation occurs between the switching of the higher-level applications and the switching of the lower-level applications, the lower-level electronic control unit may fail to appropriately calculate the actuator command value.

The present disclosure has been made in light of the above-described circumstances, and an object thereof is to enable an actuator command value to be calculated more appropriately when lower-level applications are switched in conjunction with switching of higher-level applications.

A mobile object control system according to a first aspect of the present disclosure includes a higher-level electronic control unit, a lower-level electronic control unit, and an actuator. The higher-level electronic control unit is configured to calculate a requested physical quantity that is a requested value of a physical quantity related to a driving operation of a mobile object according to each of a first higher-level application and a second higher-level application that are switchable. The lower-level electronic control unit is configured to receive the requested physical quantity from the higher-level electronic control unit, and calculate an actuator command value for causing a detected physical quantity that is a detected value of the physical quantity to follow the requested physical quantity according to a first lower-level application or a second lower-level application while performing switching between the first lower-level application and the second lower-level application in conjunction with switching between the first higher-level application and the second higher-level application. The actuator is controlled according to the actuator command value. The first lower-level application and the second lower-level application are configured to implement control operations different in terms of followability of the detected physical quantity with respect to the requested physical quantity. The lower-level electronic control unit is configured to: perform a change amount suppression process for achieving a gentler change from a previous value to a current value of the requested physical quantity than in a case where the requested physical quantity is changed stepwise from the previous value to the current value; and substitute the detected physical quantity into the previous value in the change amount suppression process in response to the switching between the first higher-level application and the second higher-level application.

Mobile object control systems according to second and third aspects of the present disclosure are different from the mobile object control system according to the first aspect in the following points. In the second aspect, the lower-level electronic control unit is configured to substitute, into the previous value in the change amount suppression process, an estimated physical quantity that is an estimated value of the physical quantity based on one or more parameters indicating behavior of the mobile object in response to the switching between the first higher-level application and the second higher-level application. In the third aspect, the lower-level electronic control unit is configured to substitute zero into the previous value in the change amount suppression process in response to the switching between the first higher-level application and the second higher-level application.

According to the first to third aspects of the present disclosure, the actuator command value can be calculated more appropriately when the lower-level applications are switched in conjunction with the switching of the higher-level applications.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a flow chart illustrating a process related to the second exemplary control according to the embodiment.

DETAILED DESCRIPTION OF EMBODIMENTS

Embodiments of the present disclosure will be described with reference to the accompanying drawings.

1. Configuration of Vehicle Steering System

Figure 1:
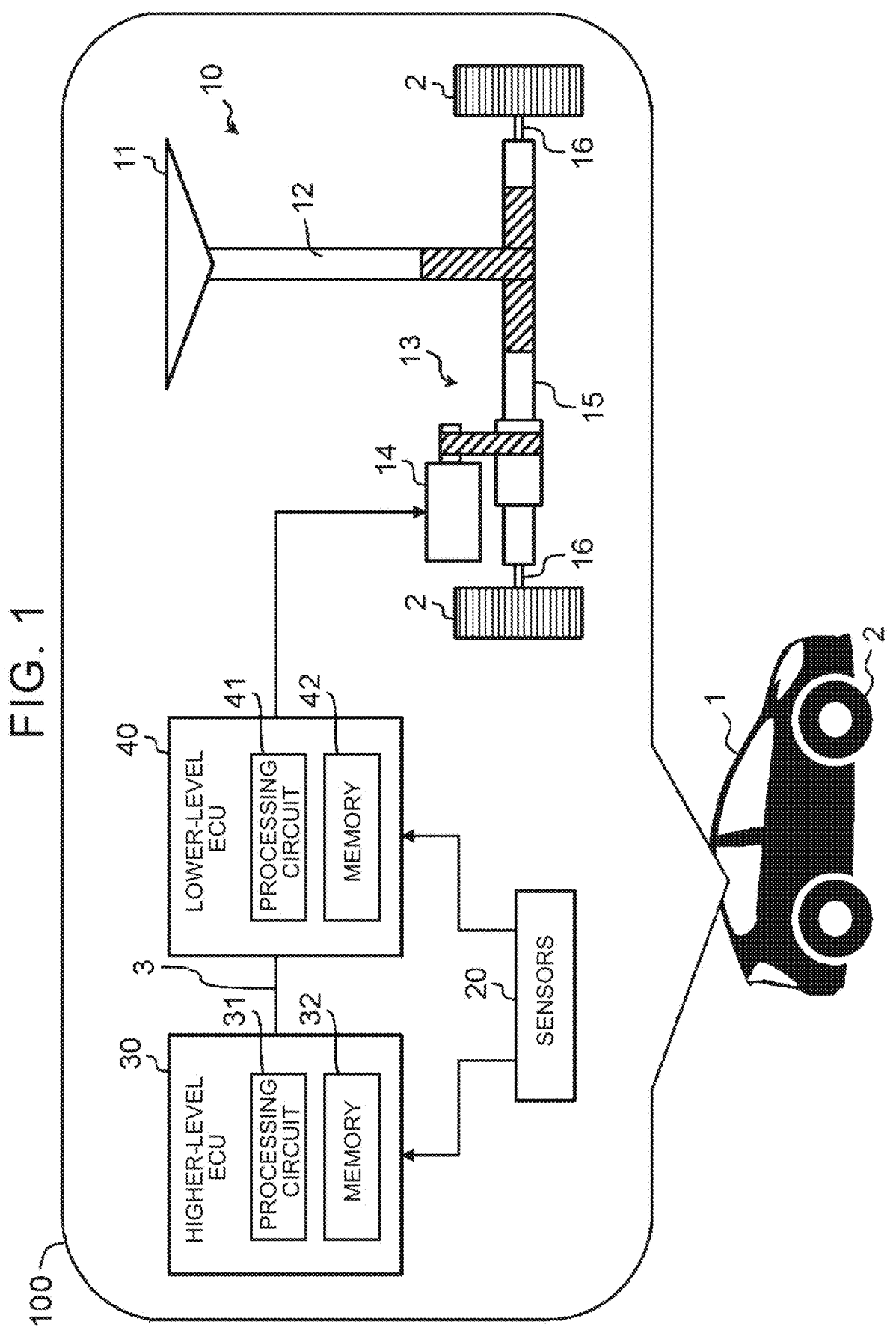
FIG. 1 is a diagram illustrating an example of a configuration of a vehicle steering system according to an embodiment.

FIG. 1 is a diagram illustrating an example of a configuration of a vehicle steering system 100 according to an embodiment. The vehicle steering system 100 is applied to a vehicle 1 (for example, a four-wheeled vehicle). The vehicle-steering system 100 includes a steering device 10, sensors 20, a higher-level electronic control unit (higher-level ECU) 30, and a lower-level electronic control unit (lower-level ECU) 40. The vehicle 1 may be an autonomous vehicle. The vehicle steering system 100 corresponds to an example of a "mobile object control system" according to the present disclosure.

The steering device 10 is a device that steers the wheels 2 of the vehicle 1. The steering device 10 includes a steering wheel 11, a steering shaft 12, and a steering unit 13. The steering wheel 11 is operated by a driver of the vehicle 1. The steering unit 13 steers the wheels 2. The steering unit 13 includes a steering actuator 14, a steering shaft (rack shaft) 15, and a tie rod 16. The steering actuator 14 is, for example, an electric motor, and generates torque for turning the wheels 2. The wheel (steered wheel) 2 is connected to the steering shaft 15 via a tie rod 16. When the steering actuator 14 linearly moves the steering shaft 15 in the axial direction thereof, the steered angle θ of the wheel 2 is changed via the tie rod 16. The steering angle θ corresponds to an example of "a physical quantity related to a driving operation (steering) of the moving body" according to the present disclosure. The steering actuator 14 is used as an electric power steering (EPS) device that assists a driver in steering. The steering device 10 may be a steer-by-wire type in which the steering wheel 11 is mechanically separated from the wheel (steered wheel) 2.

The sensors 20 include, for example, a recognition sensor, a steering angle sensor, a yaw rate sensor, a vehicle speed sensor, and a longitudinal acceleration sensor. The recognition sensor recognizes (detects) the surrounding situation of the vehicle 1. The recognition sensor includes, for example, a camera C. Alternatively, the recognition sensor may comprise at least one of, for example, a millimeter-wave radar and a LIDAR (Laser Imaging Detection and Ranging) instead of or in conjunction with the camera C. The steering angle sensor is attached to the steering actuator 14 and detects a steering angle θ (detected steering angle θd) of the wheel 2. The yaw rate sensor, the vehicle speed sensor, and the front-rear acceleration sensor detect the yaw rate, the vehicle speed, and the front-rear acceleration of the vehicle 1, respectively.

The higher-level ECU 30 and the lower-level ECU 40 can communicate with each other. For example, the higher-level ECU 30 and the lower-level ECU 40 are mounted on the vehicle 1, and the higher-level ECU 30 is connected to the lower-level ECU 40 via the communication line 3. The host ECU 30 does not necessarily have to be mounted on the vehicle 1. That is, the higher-level ECU 30 may be provided outside the vehicle 1 and configured to communicate with the lower-level ECU 40 via a radio communication network. As will be described later, the higher-level ECU 30 performs steering control of the vehicle 1 in cooperation with the lower-level ECU 40. The higher-level ECU 30 includes a processing circuit 31 and memories 32. The processing circuit 31 executes various kinds of processing including calculation of the requested steering angle θr based on information from the camera C. The requested steering angle θr is a requested value of the steering angle θ of the wheel 2. The memory 32 stores various kinds of information necessary for processing by the processing circuit 31. When the processing circuit 31 executes the computer program, various processing by the host ECU 30 is realized. The computer program is stored in the memory 32. Alternatively, the computer program may be recorded on a computer-readable recording medium.

The lower-level ECU 40 includes process circuit 41 and memories 42. The processing circuit 41 executes various processing including calculation of the torque command value Tc according to the difference (the steering angle difference 40) between the requested steering angle θr and the detected steering angle θd (in other words, the actual steering angle) received from the higher-level ECU 30. The torque command value Tc is an actuator command value that is instructed to the steering actuator 14 in order to make the detected steering angle θd follow the requested steering angle θr. The memory 42 stores various kinds of information necessary for processing by the processing circuit 41. When the processing circuit 41 executes the computer program, various processing by the lower-level ECU 40 is realized. The computer program is stored in the memory 42. Alternatively, the computer program may be recorded on a computer-readable recording medium.

2. Steering Control

Figure 2:
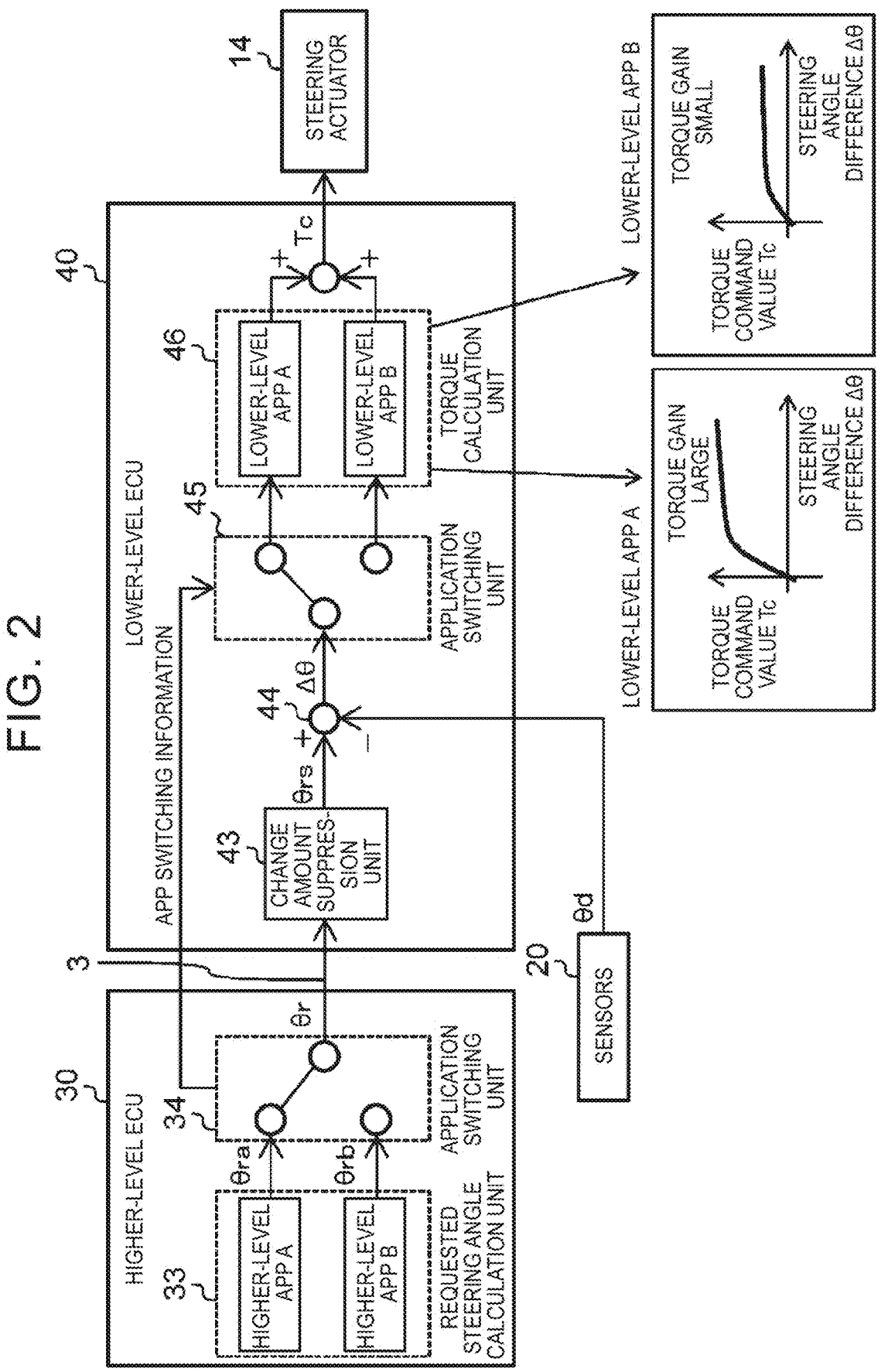
FIG. 2 is a block diagram illustrating a functional configuration of steering control according to the embodiment.

FIG. 2 is a block diagram illustrating a functional configuration of steering control according to the embodiment. As described above, the steering control is performed by the cooperation of the higher-level ECU 30 and the lower-level ECU 40. As illustrated in FIG. 2, the higher-level ECU 30 includes a requested steering angle calculation unit 33 and an application switching unit 34.

In order to calculate the requested steering angle θr, the requested steering angle calculation unit 33 uses a plurality of higher-level applications (hereinafter, abbreviated as "higher-level applications"). The plurality of higher-level applications is included in the computer program stored in the memory 32. More specifically, the higher-level application is a steering support application that supports steering by a driver. In the example illustrated in FIG. 2, the two higher-level applications A and B correspond to an example of the plurality of higher-level applications described here. The number of the plurality of higher-level applications may be three or more.

Specifically, the higher-level application A is, for example, an application that provides a function of calculating a requested steering angle θra so as to avoid an obstacle present on a traveling lane in front of the vehicle 1 when the obstacle is detected by the camera C. The higher-level application B is, for example, an application that provides a function of calculating a requested steering angle θrb so that the vehicle 1 travels following the traveling lane on the basis of the vehicle periphery information from the camera C. The requested steering angle calculation unit 33 calculates the requested steering angles θra and θrb of the higher-level applications A and B in parallel with each other in a predetermined control cycle (calculation cycle).

Application Switching Unit 34

The application switching unit 34 switches the higher-level application between the higher-level application A and the higher-level application B by selectively selecting the higher-level applications A and B. This switching is performed, for example, as follows. That is, the application switching unit 34 basically selects the higher-level application B for causing the vehicle 1 to travel following the travel lane. When an obstacle existing on the traveling lane is detected by the camera C, the application switching unit 34 selects the higher-level application A, that is, switches from the higher-level application B to the higher-level application A. Then, when it is determined by the peripheral information from the camera C that the vehicle 1 has finished avoiding the obstacle, the application switching unit 34 selects the higher-level application B, that is, switches from the higher-level application A to the higher-level application B. According to such switching, the requested steering angle $\theta r$ output from the application switching unit 34 is stepwise switched between the requested steering angle $\theta ra$ and the requested steering angle $\theta rb$.

The higher-level ECU 30 transmits the calculated requested steering angle $\theta r$ (more specifically, the requested steering angle $\theta ra$ or $\theta rb$ calculated by the higher-level application A or B selected by the application switching unit 34) to the lower-level ECU 40 via the communication line 3. In addition, the higher-level ECU 30 transmits the "application switching data" to the lower-level ECU 40 together with the requested steering angle $\theta r$. The application switching information is, for example, ID (Identification specifying the higher-level application A or B currently selected by the application switching unit 34).

On the other hand, as shown in FIG. 2, the lower-level ECU 40 includes a change amount suppression unit 43, a subtraction unit 44, an application switching unit 45, and a torque calculation unit 46. In order to calculate the torque command value Tc, the torque calculation unit 46 uses a plurality of lower-level applications (hereinafter, abbreviated as "lower-level applications"). The plurality of lower-level applications is included in the computer program stored in the memory 42. More specifically, the lower-level application is also a steering support application that supports steering by a driver. Each lower-level application is paired with one of a plurality of higher-level applications. In the example illustrated in FIG. 2, the higher-level application A and the lower-level application A are paired, and the higher-level application B and the lower-level application B are paired.

In order to suppress a sudden change in the requested steering angle $\theta r$, the change amount suppression unit 43 executes a change amount suppression process (in other words, a smoothing process). In the change amount suppressing process, the change from the previous value $\theta r$ (n−1) to the current value $\theta r$ (n) is made slower than when the requested steering angle $\theta r$ is stepwise changed from the previous value $\theta r$ (n−1) to the current value $\theta r$ (n). More specifically, the change amount suppressing process is, for example, a process of limiting the change amount $\Delta \theta r$ from the previous value $\theta r$ (n−1) to the current value $\theta r$ (n) to a predetermined upper limit value or less. The change amount suppression unit 43 outputs the requested steering angle $\theta rs$ after the change amount suppressing process to the subtraction unit 44. In addition, the variation suppressing process may include a filtering process of applying a low-pass filter (LPF) to the time-series data of the requested steering angle $\theta r$. Also, the change reduction process of the requested steering angle $\theta r$ may be performed in the same manner on the higher-level ECU 30.

The subtraction unit 44 calculates the steering angle difference $\Delta \theta$ by subtracting the detected steering angle (current actual steering angle) $\theta d$ from the requested steering angle $\theta rs$ output from the change amount suppression unit 43, and transmits the calculated steering angle difference $\Delta \theta$ to the application switching unit 45. In order to calculate the steering angle difference $\Delta \theta$, an estimated steering angle $\theta e$, which will be described later, may be used instead of the detected steering angle $\theta d$.

The application switching data transmitted from the higher-level ECU 30 to the lower-level ECU 40 is inputted to the application switching unit 45. The application switching unit 45 switches the lower-level application in conjunction with the switching of the higher-level application by the application switching unit 34 based on the application switching information (that is, the application switching request). Specifically, the application switching unit 45 selectively selects the lower-level applications A and B in conjunction with the switching of the higher-level application, thereby switching the lower-level application used in the torque calculation unit 46 between the lower-level application A and the lower-level application B. More specifically, the output destination of the steering angle difference $\Delta \theta$ received from the subtraction unit 44 is stepwise switched between the lower-level application A and the lower-level application B.

The lower-level application A is an application that provides a function of calculating a torque command value Tc corresponding to a steering angle difference $\Delta \theta$ based on a requested steering angle $\theta ra$ of the higher-level application A. Similarly, the lower-level application B is an application that provides a function of calculating a torque command value Tc corresponding to the steering angle difference $\Delta \theta$ based on the requested steering angle $\theta rb$ of the higher-level application B.

As shown in FIG. 2, the relation of the torque command value Tc to the steering angle difference $\Delta \theta$ (referred to as "torque gain") is different between the lower-level applications A and B. Specifically, the point where the torque command value Tc (absolute value) increases as the steering angle difference $\Delta \theta$ (absolute value) increases is shared between the lower-level applications A and B. Then, the magnitude of the torque command value Tc with respect to the same steering angle difference $\Delta \theta$ is determined such that the lower-level application A is larger than the lower-level application B. In other words, the torque gain is determined such that the lower-level application A is larger than the lower-level application B.

Figure 3:
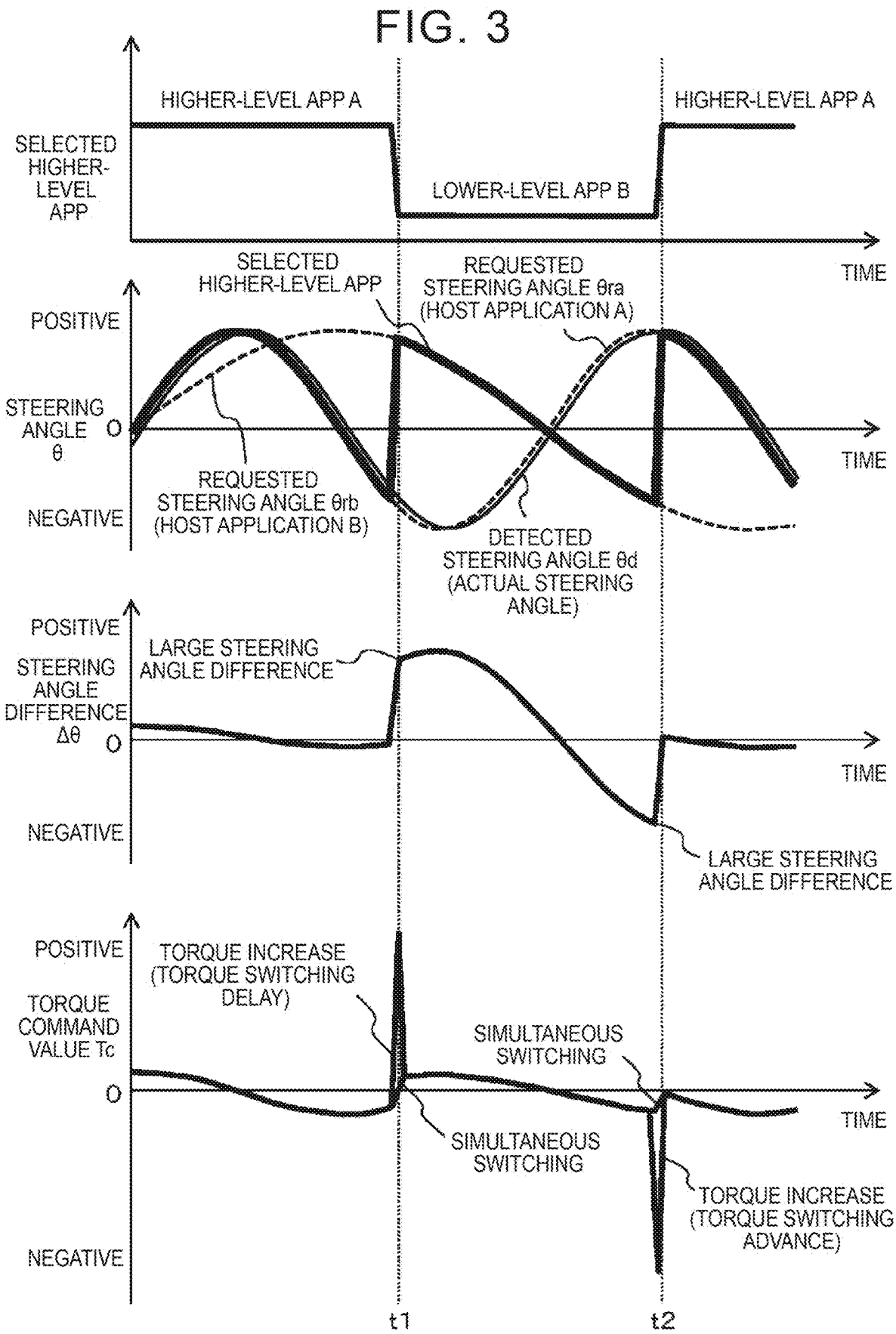
FIG. 3 is a diagram for concretely explaining a problem when a relationship between a higher-level application and a lower-level application becomes inconsistent.

Therefore, when the lower-level application A is selected, the control of the detected steering angle (actual steering angle) $\theta d$ with respect to the requested steering angle (target steering angle) $\theta r$ with high followability is realized. As a result, as shown in FIG. 3, which will be described later, the steering angle difference $\Delta \theta$ during the selection of the lower-level application A becomes small. Thus, when the higher-level application A calculates the requested steering angle $\theta ra$ so as to avoid an obstacle, for example, the detected steering angle (actual steering angle) $\theta d$ can be quickly brought close to the requested steering angle $\theta ra$. On the other hand, when the lower-level application B is selected, a control that has a lower followability of the detected steering angle $\theta d$ with respect to the requested steering angle $\theta r$ than when the lower-level application A is selected is realized. As a result, as shown in FIG. 3, the steering angle difference $\Delta \theta$ during the selection of the lower-level application B increases.

The relation between the steering angle difference Δθ and the torque command value Tc as shown in FIG. 2 is stored in the memory 42 as a map for each of the lower-level applications. When the lower-level application A is selected by the application switching unit 45, the torque calculation unit 46 calculates the torque command value Tc corresponding to the steering angle difference Δθ from the map corresponding to the lower-level application A. Similarly, when the lower-level application B is selected, the torque calculation unit 46 calculates the torque command value Tc corresponding to the steering angle difference Δθ from the map corresponding to the lower-level application B. The steering actuator 14 is controlled in accordance with the torque command value Tc, and generates a torque corresponding to the torque command value Tc.

Next, a problem of the vehicle steering system 100 according to the embodiment will be described. As described above, there is a case where the lower-level application is switched in conjunction with the switching of the higher-level application. If a timing shift occurs between the switching of the higher-level application and the switching of the lower-level application, the lower-level ECU 40 may not be able to appropriately calculate the torque command value Tc.

Specifically, when there is a difference in followability in the control realized by the lower-level application A and the lower-level application B as described above (in other words, when there is a difference in torque gain), there are the following problems. That is, when the lower-level application is switched simultaneously with the switching of the higher-level application, the lower-level ECU 40 can appropriately calculate the torque command value Tc according to the lower-level application A corresponding to the higher-level application A after the switching. Alternatively, the lower-level ECU 40 can appropriately calculate the torque command value Tc according to the lower-level application B corresponding to the higher-level application B after switching. On the other hand, due to the above-described variation suppressing process or communication delay between the higher-level ECU 30 and the lower-level ECU 40, the higher-level application that calculates the requested steering angle θr and the lower-level application that calculates the torque command value Tc may be inconsistent with each other at the time of switching the higher-level application. When the relation between the higher-level application and the lower-level application is inconsistent in this way, as illustrated in FIG. 3, the lower-level ECU 40 cannot appropriately calculate the torque command value Tc in response to an application switching request from the higher-level ECU 30. In addition, when the change amount suppressing process is executed, the higher-level application that has calculated the current value θr(n) and the higher-level application that has calculated the previous value θr(n−1) temporarily differ from each other when the higher-level application is switched.

FIG. 3 is a diagram for concretely explaining a problem when a relationship between a higher-level application and a lower-level application becomes inconsistent. FIG. 3 illustrates an example in which, after switching from the higher-level application A to the higher-level application B is performed in the vicinity of the time point t1, switching from the higher-level application B to the higher-level application A is performed in the vicinity of the time point t2. From FIG. 3, it can be seen that the detected steering angle θd favorably follows the requested steering angle θr (θra) during the selection of the lower-level application A having a large torque gain (before the time point t1 and after the time point t2). Further, in this embodiment, a large steering angle difference Δθ is generated between the requested steering angle θrb of the higher-level application B and the detected steering angle θd in the vicinity of the respective time points t1 and t2 of the switching of the higher-level application.

First, the switching from the higher-level application A to the higher-level application B in the vicinity of the time point t1 will be described. When the lower-level application is switched at the same time as the higher-level application is switched without the relation between the higher-level application and the lower-level application becoming inconsistent, the torque-command-value Tc is appropriately calculated as in the case of the wave form labeled "simultaneous switching". On the other hand, there may be a mismatch in which switching from the lower-level application A to the lower-level application B is performed before switching from the higher-level application A to the higher-level application B. In this case, the lower-level ECU 40 calculates a torque command value Tc for reducing the steering angle difference Δθ according to the requested steering angle θra based on the higher-level application A, according to the lower-level application B having a small torque gain. Consequently, the torque command value Tc is reduced as compared with the case of the simultaneous switching in which the lower-level application A is used. In addition, there may be a case where the switching from the higher-level application A to the higher-level application B occurs before the switching from the lower-level application A to the lower-level application B. In this case, the lower-level ECU 40 calculates the torque command value Tc for reducing the large steering angle difference Δθ (see FIG. 3) corresponding to the requested steering angle θrb based on the higher-level application B, in accordance with the lower-level application A having a large torque gain. As a consequence, the torque command value Tc increases as compared with the case of the simultaneous switching, such as the wave form labeled "torque increase (torque switching delay)" in FIG. 3. This can lead to an unwanted torque being applied to the driver via the steering wheel 11.

Next, the switching from the higher-level application B to the higher-level application A in the vicinity of the time point t2 will be described. In this case as well, in the case of "simultaneous switching", the torque-command-value Tc is appropriately calculated. On the other hand, there may be a case where the switching from the higher-level application B to the higher-level application A is performed before the switching from the lower-level application B to the lower-level application A. In this case, the lower-level ECU 40 calculates a torque command value Tc for reducing the steering angle difference Δθ according to the requested steering angle θra based on the higher-level application A, according to the lower-level application B having a small torque gain. Consequently, the torque command value Tc is reduced as compared with the case of the simultaneous switching in which the lower-level application A is used. Further, there is a case where a mismatch occurs in which switching from the lower-level application B to the lower-level application A is performed before switching from the higher-level application B to the higher-level application A. In this case, the lower-level ECU 40 calculates the torque command value Tc for reducing the large steering angle difference Δθ (see FIG. 3) corresponding to the requested steering angle θrb based on the higher-level application B, in accordance with the lower-level application A having a large torque gain. As a consequence, the torque command value Tc increases as compared with the case of the simultaneous switching, such as the wave form labeled "torque increase (torque switching advance)" in FIG. 3. This can also lead to an unwanted torque being applied to the driver via the steering wheel 11.

2-1. First Control Example

In view of the above problem, in the first control example according to the present embodiment, the lower-level ECU 40 uses the detected steering angle $\theta d$ instead of the previous value $\theta r(n-1)$ of the requested steering angle $\theta r$ as the previous value of the variation suppressing process in accordance with the switching of the higher-level application. More specifically, for example, the current value $\theta d(n)$ of the detected steering angle $\theta d$ is used.

Figure 4:
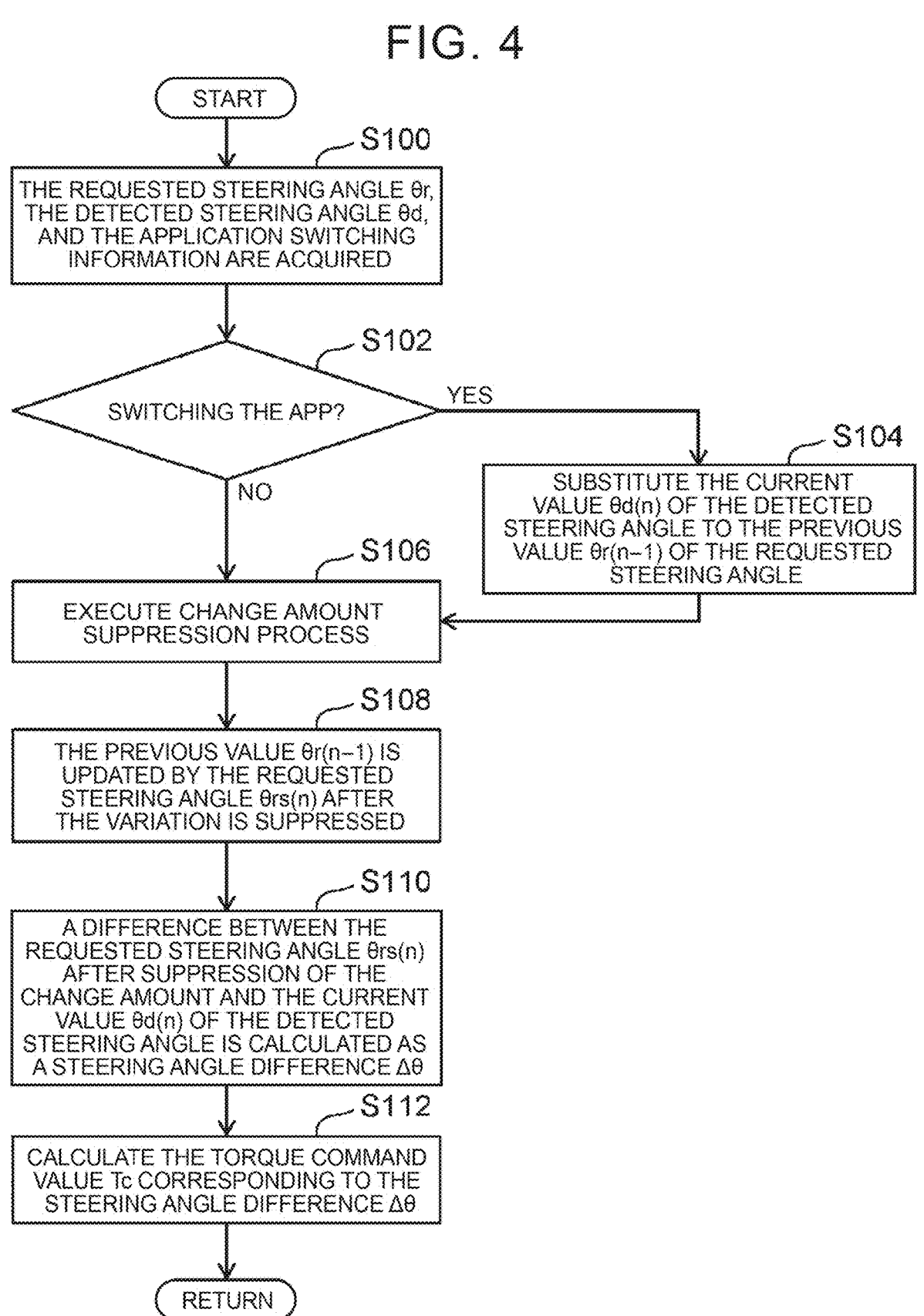
FIG. 4 is a flowchart illustrating a process related to the first control example according to the embodiment.

FIG. 4 is a flowchart illustrating processing related to the first control example according to the embodiment. The process of this flow chart is executed by the lower-level ECU 40 in a predetermined control cycle.

In S100, the lower-level ECU 40 acquires the requested steering angle $\theta r$ ($\theta ra$ or $\theta rb$) and the application switching information from the higher-level ECU 30, and acquires the detected steering angle $\theta d$ from the sensors 20 (steering angle sensors).

Next, in S102, the lower-level ECU 40 determines whether or not the higher-level application is switched based on the application switching data. For example, when ID information of the higher-level application included in the application switching information acquired this time differs from ID information acquired last time, the lower-level ECU 40 determines that the higher-level application has been switched. If there is a switch of the higher-level application, the process proceeds to S104.

In S104, the lower-level ECU 40 (change amount suppressing unit 43) substitutes the current value $\theta d(n)$ of the detected steering angle $\theta d$ acquired by S100 into the previous value $\theta r(n-1)$ of the requested steering angle $\theta r$ in the change amount suppressing process described above. In other words, the previous value $\theta r(n-1)$ is replaced by the current value $\theta d(n)$.

After S104, the process proceeds to S106. When there is no switching of the higher-level application (S102; No), the process proceeds to S106 without replacing the previous value $\theta r(n-1)$ with the current value $\theta d(n)$.

In S106, the lower-level ECU 40 executes a variation suppressing process. As a result, the requested steering angle (current value) $\theta rs(n)$ after the amount of change is suppressed is calculated. Next, in S108, the lower-level ECU 40 updates the previous value $\theta r(n-1)$ of the variation suppressing process with the current value $\theta rs(n)$. The updated previous value $\theta r(n-1)$ is used in the following control cycle.

In S110 following S108, the lower-level ECU 40 calculates the difference between the requested steering angle $\theta rs(n)$ after the suppression of the change amount and the current value $\theta d(n)$ of the detected steering angle as the steering angle difference $\Delta\theta$. Next, in S112, the lower-level ECU 40 calculates the torque command value Tc corresponding to the calculated steering angle difference $\Delta\theta$ using the same lower-level application as the currently selected higher-level application on the basis of the latest application switching information.

Figures 5A, 5B:
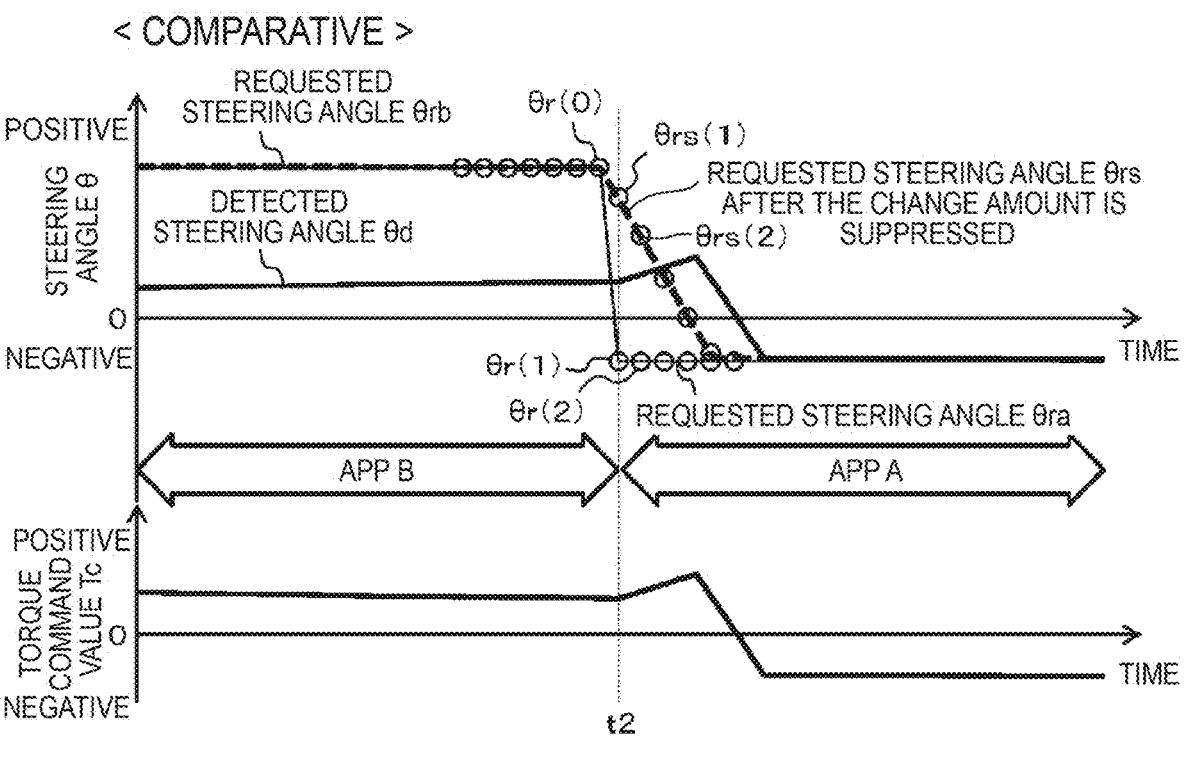
FIG. 5A is a diagram for explaining a comparative example of steering control.
FIG. 5B is a diagram for explaining an operation of a first control example.

FIG. 5A is a diagram for explaining a comparative example of the steering control, FIG. 5B is a diagram for explaining the operation of the first control example.

The comparative example corresponds to an example in which the previous value $\theta r(n-1)$ is not replaced with the detected steering angle (current value) $\theta d(n)$ at the time of switching the higher-level application. Specifically, it is shown in FIG. 5A. In response to the switching from the higher-level application B to the higher-level application A in the vicinity of the time point t2, the requested steering angle $\theta r$ is stepwise switched from the previous value $\theta r(0)$ to the current value $\theta r(1)$. The previous value $\theta r(0)$ is a requested steering angle $\theta rb$ based on the higher-level application B. The current value $\theta r(1)$ is the requested steering angle $\theta ra$ based on the higher-level application A. In addition, in the illustrated in FIG. 5A, the detected steering angle $\theta d$ is located between the requested steering angles $\theta ra$ and $\theta rb$ of the higher-level applications A and B before and after switching.

In the change amount suppressing process according to the comparative example, the requested steering angle $\theta rs(1)$ in which the change in the requested steering angle $\theta r$ due to the stepwise switching is suppressed is calculated. In the calculation cycle next to the calculation cycle, the change amount suppressing process is executed by using the requested steering angle $\theta rs(1)$ as the previous value and using the requested steering angle (current value) $\theta r(2)$ based on the higher-level application A as the current value. As a result, the requested steering angle $\theta rs(2)$ after the change amount is suppressed is calculated. This also applies to the subsequent calculation cycle. In the exemplary embodiment shown in FIG. 5A, the requested steering angle $\theta rs$ after the suppression of the amount of change converges to the requested steering angle $\theta ra$ of the higher-level application A after the switching.

According to the change amount suppressing process of the comparative example, the requested steering angles $\theta rs$ ($\theta rs(1)$ and $\theta rs(2)$) immediately after the change amount suppression of the application is switched are located on the side farther than the detected steering angle $\theta d$ with respect to the requested steering angle $\theta ra$ after the switching. Consequently, the torque command value Tc calculated by the lower-level ECU 40 on the basis of the steering angle difference $\Delta\theta$ between the requested steering angle $\theta rs$ and the detected steering angle (actual steering angle) $\theta d$ after the change amount suppression changes in the direction opposite to the target direction (upward direction in FIG. 5A) by the higher-level application A after the switching. As a result, the detected steering angle (actual steering angle) $\theta d$ changes in the direction opposite to the requested steering angle $\theta ra$. As described above, according to the comparative example, unnecessary torque change may occur as the application is switched. More specifically, since the torque command value Tc after the switching is calculated in accordance with the lower-level application A having a large torque gain, an unnecessary torque change may be large.

On the other hand, according to the change amount suppressing process according to the first control example, as shown in FIG. 5B, the previous value $\theta r(0)$ is replaced by the detected steering angle (current value) $\theta d(1)$. Thus, the requested steering angle $\theta rs$ ($\theta rs(1)$ or the like) immediately after the change amount suppression immediately after the switching of the application is located closer to the detected steering angle $\theta d$ than the requested steering angle $\theta ra$ after the switching. Consequently, the torque command value Tc calculated by the lower-level ECU 40 changes in the target direction (the downward direction in FIG. 5B) by the higher-level application A after the switching. Therefore, the detected steering angle (actual steering angle) $\theta d$ can be changed so as to approach the requested steering angle $\theta ra$. As described above, according to the first control example, unnecessary torque change caused by application switching can be suppressed. This leads to a reduction in the application of unwanted torque to the driver.

As described above, according to the first control example, the torque command value Tc (actuator command value) can be calculated more appropriately when the lower-level application is switched in conjunction with the switching of the higher-level application. More specifically, the torque command value Tc of the steering actuator 14 is determined based on the steering angle difference $\Delta\theta$ as described above, that is, is determined based on the detected steering angle (actual steering angle) $\theta d$. Therefore, the detected steering angle $\theta d$ is suitable as the previous value of the change amount suppressing process at the time of switching of the higher-level application in which the requested steering angle $\theta r$ changes stepwise.

2-2. Second Control Example

In the second control example, the lower-level ECU 40 uses the estimated steering angle $\theta e$ instead of the previous value $\theta r(n-1)$ of the requested steering angle $\theta r$ as the previous value of the variation suppressing process in response to the switching of the higher-level application. More specifically, for example, the current value $\theta e(n)$ of the estimated steering angle de is used. The estimated steering angle $\theta e$ is calculated based on one or more parameters indicative of vehicle behavior. The one or more parameters are, for example, a vehicle speed and a yaw rate.

FIG. 6 is a flowchart illustrating processing related to a second control example according to the embodiment. The processing of this flowchart is different from the flowchart shown in FIG. 4 in that the processing of S200 is executed instead of S104.

In FIG. 6, when there is switching of the higher-level application, the process proceeds to S200. In S200, the lower-level ECU 40 (change amount suppressing unit 43) calculates the estimated steering angle $\theta e$ on the basis of the vehicle speed and the yaw rate acquired by using the sensors 20. The calculation of the estimated steering angle $\theta e$ may be performed by another ECU such as a higher-level ECU 30. Then, the lower-level ECU 40 substitutes the calculated estimated steering angle (current value) $\theta e(n)$ into the previous value $\theta r(n-1)$ of the requested steering angle $\theta r$ in the variation suppressing process. In other words, the previous value $\theta r(n-1)$ is replaced by the current value $\theta e(n)$.

According to the second control example, when the lower-level application is switched in conjunction with the switching of the higher-level application, the torque-command value Tc (actuator-command value) can be calculated more appropriately. More specifically, the estimated steering angle $\theta e$ basically takes a value close to the detected steering angle $\theta d$. Therefore, similarly to the detected steering angle $\theta d$, the estimated steering angle $\theta e$ is also suitable as the previous value of the change amount suppression processing at the time of switching of the higher-level application in which the requested steering angle $\theta r$ changes stepwise. In addition, in the steer-by-wire type steering device described above, a situation may occur in which the vehicle behavior and the detected steering angle (actual steering angle) $\theta d$ do not coincide with each other. Under such a situation, the estimated steering angle $\theta e$ is more suitable than the detected steering angle $\theta d$ as the previous value of the change amount suppression processing at the time of switching of the higher-level application.

2-3. Third Control Example

In the third control example, the lower-level ECU 40 uses zeros in place of the previous value $\theta r(n-1)$ of the requested steering angle $\theta r$ as the previous value of the variation suppressing process in response to the switching of the higher-level application.

Figure 7:
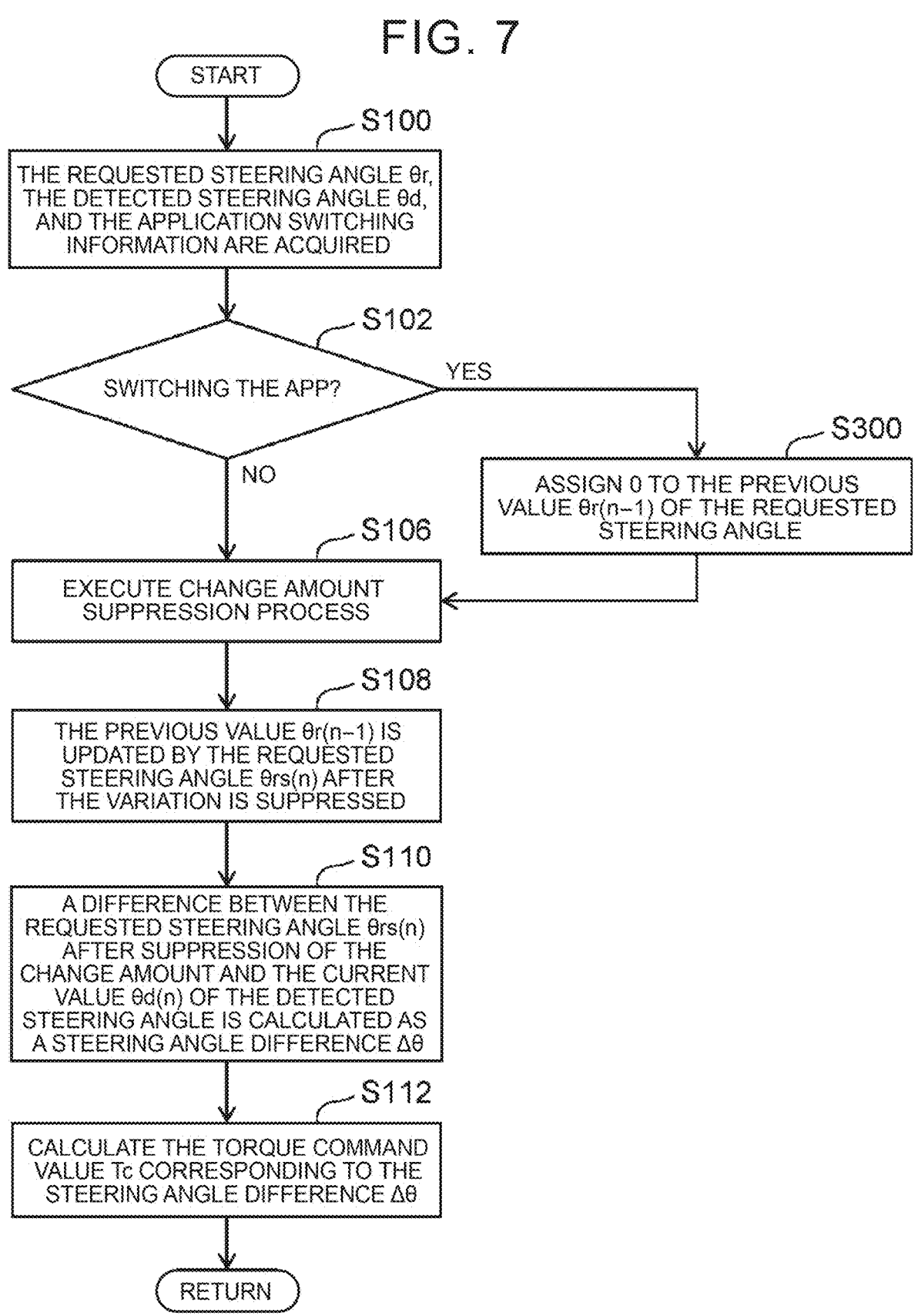
FIG. 7 is a flowchart illustrating processing related to a third control example according to the embodiment.

FIG. 7 is a flowchart illustrating processing related to a third control example according to the embodiment. The processing of this flowchart is different from the flowchart shown in FIG. 4 in that the processing of S300 is executed instead of S104.

In FIG. 7, when there is switching of the higher-level application, the process proceeds to S300. In step 300, the lower-level ECU 40 (change amount suppressing unit 43) substitutes zero for the previous value $\theta r(n-1)$ of the requested steering angle $\theta r$ in the change amount suppressing process. In other words, the previous value $\theta r(n-1)$ is replaced by zeros.

According to the third control example, when the lower-level application is switched in conjunction with the switching of the higher-level application, the torque command value Tc (actuator command value) can be calculated more appropriately. More specifically, it is preferable to use the zero-point of the steering angle $\theta$ as the previous value of the change amount suppressing process in order to suppress such a situation as shown in FIG. 5A. That is, it is preferable to restrain the steering angle difference $\Delta\theta$ calculated at the time of the switching from becoming excessively large under a situation in which the signs of the requested steering angles $\theta r$ of the two higher-level applications before and after the switching are different.

3. Another Example of Mobile Object Control System

The "moving body" according to the present disclosure is not limited to a vehicle such as an automobile, and may be, for example, a construction machine, a robot, an airframe, or a ship. The "mobile object control system" according to the present disclosure is not limited to the vehicle steering system 100 that executes the above-described steering control as long as it includes the "higher-level ECU", "lower-level ECU", and "actuator" according to the present disclosure.

Specifically, the vehicle control system may include, for example, an actuator capable of driving an accelerator pedal as an "actuator" according to the present disclosure. In the example of the actuator, for example, the front-rear acceleration or the vehicle speed corresponds to the "physical quantity related to the driving operation (acceleration/deceleration)". The higher-level application may include, for example, a first higher-level application that calculates a requested before-and-after acceleration or a requested vehicle speed for acceleration, and a second higher-level application that calculates a requested before-and-after acceleration or a requested vehicle speed for deceleration.

The "actuator" according to the present disclosure may be, for example, an actuator capable of driving a brake pedal. In the example of the actuator, for example, the front-rear acceleration or the vehicle speed corresponds to the "physical quantity related to the driving operation (braking)". The higher-level application may include, for example, a first higher-level application that calculates a requested before-and-after acceleration or a requested vehicle speed for braking based on the first information, and a second higher-level application that calculates a requested before-and-after acceleration or a requested vehicle speed for braking based on the second information.

Further, the "actuator" according to the present disclosure may be, for example, a powertrain (at least one of an internal combustion engine and an electric motor for driving a vehicle). Also, in the example of the actuator, for example, the front-rear acceleration or the vehicle speed corresponds to the "requested physical quantity related to the driving operation (for example, acceleration/deceleration)". An example of the higher-level application is the same as the higher-level application in the example of the actuator capable of driving the accelerator pedal.

In addition, the mobile object control system in the example using not only two or more higher-level applications in which the "requested physical quantity" is switched stepwise, but also two or more higher-level applications in which the "requested physical quantity" is switched continuously, such as switching of the requested steering angle θr by the application switching unit 34 (see FIG. 2), may be configured as follows. That is, the mobile object control system may be configured to be able to switch whether or not to use the "detected physical quantity" (the same applies to the example of "estimated physical quantity" and zero) as the previous value of the requested physical quantity in the change amount suppression process, in accordance with the combination of the higher-level apps to be switched. Thus, it is possible to provide a more versatile moving object control.

What is claimed is:

1. A mobile object control system comprising:
a higher-level electronic control circuit configured to calculate a requested physical quantity that is a requested value related to a driving operation of a mobile object according to a first higher-level application being switchable with a second higher-level application;
a lower-level electronic control circuit configured to receive the requested physical quantity from the higher-level electronic control circuit, and calculate an actuator command value to cause a detected physical quantity that is a detected value to follow the requested physical quantity according to a first lower-level application or a second lower-level application while switching between the first lower-level application and the second lower-level application in conjunction with switching between the first higher-level application and the second higher-level application;
a recognition sensor including at least one of a camera, a millimeter-wave radar, and a laser imaging detection and ranging; and
an actuator to be controlled according to the actuator command value,
wherein
the recognition sensor is configured to detect periphery information of the mobile object,
the first lower-level application and the second lower-level application are configured to implement control operations different in terms of followability of the detected physical quantity with respect to the requested physical quantity,
the lower-level electronic control circuit is configured to
perform a change amount suppression process for achieving a gentler change from a previous value to a current value of the requested physical quantity than in a case where the requested physical quantity is changed stepwise from the previous value to the current value, and
substitute the detected physical quantity into the previous value in the change amount suppression process in response to the switching between the first higher-level application and the second higher-level application,
the first higher-level application provides a function of calculating a requested steering angle to avoid an obstacle present on a traveling lane in front of the mobile object in a case where the obstacle is detected by the recognition sensor, and
the second higher-level application provides a function of calculating a requested steering angle such that the mobile object travels following the traveling lane on the basis of the periphery information from the recognition sensor.

2. A mobile object control system comprising:
a higher-level electronic control circuit configured to calculate a requested physical quantity that is a requested value related to a driving operation of a mobile object according to a first higher-level application being switchable with a second higher-level application;
a lower-level electronic control circuit configured to receive the requested physical quantity from the higher-level electronic control circuit, and calculate an actuator command value to cause a detected physical quantity that is a detected value to follow the requested physical quantity according to a first lower-level application or a second lower-level application while switching between the first lower-level application and the second lower-level application in conjunction with switching between the first higher-level application and the second higher-level application;
a recognition sensor including at least one of a camera, a millimeter-wave radar and a laser imaging detection and ranging; and
an actuator to be controlled according to the actuator command value,
wherein
the recognition sensor is configured to detect periphery information of the mobile object,
the first lower-level application and the second lower-level application are configured to implement control operations different in terms of followability of the detected physical quantity with respect to the requested physical quantity,
the lower-level electronic control circuit is configured to
perform a change amount suppression process for achieving a gentler change from a previous value to a current value of the requested physical quantity than in a case where the requested physical quantity is changed stepwise from the previous value to the current value, and
substitute, into the previous value in the change amount suppression process, an estimated physical quantity value of the physical quantity, based on one or more parameters indicating behavior of the mobile object, in response to the switching between the first higher-level application and the second higher-level application,
the first higher-level application provides a function of calculating a requested steering angle to avoid an obstacle present on a traveling lane in front of the mobile object in a case where the obstacle is detected by the recognition sensor, and
the second higher-level application provides a function of calculating a requested steering angle such that the mobile object travels following the traveling lane on the basis of the periphery information from the recognition sensor.

3. A mobile object control system comprising:

a higher-level electronic control circuit configured to calculate a requested physical quantity that is a requested value related to a driving operation of a mobile object according to a first higher-level application being switchable with a second higher-level application;

a lower-level electronic control circuit configured to receive the requested physical quantity from the higher-level electronic control circuit, and calculate an actuator command value to cause a detected physical quantity that is a detected value to follow the requested physical quantity according to a first lower-level application or a second lower-level application while switching between the first lower-level application and the second lower-level application in conjunction with switching between the first higher-level application and the second higher-level application;

a recognition sensor including at least one of a camera, a millimeter-wave radar and a laser imaging detection and ranging; and an actuator to be controlled according to the actuator command value, wherein the recognition sensor is configured to detect periphery information of the mobile object, the first lower-level application and the second lower-level application are configured to implement control operations different in terms of followability of the detected physical quantity with respect to the requested physical quantity, the lower-level electronic control circuit is configured to perform a change amount suppression process for achieving a gentler change from a previous value to a current value of the requested physical quantity than in a case where the requested physical quantity is changed stepwise from the previous value to the current value, and substitute zero into the previous value in the change amount suppression process in response to the switching between the first higher-level application and the second higher-level application, the first higher-level application provides a function of calculating a requested steering angle to avoid an obstacle present on a traveling lane in front of the mobile object in a case where the obstacle is detected by the recognition sensor, and the second higher-level application provides a function of calculating a requested steering angle such that the mobile object travels following the traveling lane on the basis of the periphery information from the recognition sensor.

4. The mobile object control system according to claim 1, wherein:

the mobile object is a vehicle;

the physical quantity is the steering angle of a wheel of the vehicle;

the actuator is an electric motor configured to generate a torque for changing the steering angle; and the actuator command value is a torque command value for causing an actual steering angle serving as the detected physical quantity to follow the requested steering angle serving as the requested physical quantity.

5. The mobile object control system according to claim 1, wherein the first lower-level application and the second lower-level application are configured to implement different torque gains.

* * * * *